United States Patent [19]
Pulker

[11] 3,927,228
[45] Dec. 16, 1975

[54] METHOD OF DEPOSITING TITANIUM DIOXIDE LAYERS BY EVAPORATION OF A MOLTEN TITANTIUM-OXYGEN PHASE

[75] Inventor: Hans K. Pulker, Triesen, Liechtenstein

[73] Assignee: Balzers Patent-und Beteiligungs-Aktiengesellschaft, Liechtenstein

[22] Filed: May 6, 1974

[21] Appl. No.: 467,572

[30] Foreign Application Priority Data
May 21, 1973 Switzerland.......................... 7233/73

[52] U.S. Cl. ................ 427/162; 427/166; 427/248; 427/255; 423/610
[51] Int. Cl.² ..................... C23C 11/08; B29O 11/00
[58] Field of Search............... 117/106 R, 221, 33.3; 423/610; 427/162, 166, 248, 255

[56] References Cited
UNITED STATES PATENTS

| | | | |
|---|---|---|---|
| 2,784,115 | 3/1957 | Brinsmaid et al. | 117/106 R |
| 2,920,002 | 1/1960 | Auwarter | 117/106 R X |
| 3,201,667 | 8/1965 | Varga | 117/106 R X |

*Primary Examiner*—Harris A. Pitlick
*Attorney, Agent, or Firm*—McGlew and Tuttle

[57] ABSTRACT

A method of producing $TiO_2$ layers comprises evaporating a molten titanium-oxygen having a composition corresponding to a proportion of the number of oxygen atoms to the number of titanium atoms of from 1.6 to 1.8, and condensing the vapor on a layer support in the presence of oxygen.

5 Claims, No Drawings

METHOD OF DEPOSITING TITANIUM DIOXIDE LAYERS BY EVAPORATION OF A MOLTEN TITANTIUM-OXYGEN PHASE

BACKGROUND OF THE INVENTION

1. Field of the Invention

This invention relates in general to the method of forming $TiO_2$ layers on a layer support and, in particular, to a new and useful method wherein molten titanium-oxygen having a composition corresponding to a proportion of oxygen atoms to titanium atoms are from 1.6 to 1.8 and subsequently condensing the vapors on a layer support in the presence of oxygen.

2. Description of the Prior Art

The present invention relates to a method of depositing $TiO_2$ layers by evaporation. It is well-known that, by evaporation of $TiO_2$ from a heated crucible under vacuum and condensation of the vapor, no pure $TiO_2$ layer can be obtained on the layer support, but only a layer comprising portions of lower oxides or titanium metal. Such a layer is light-absorbent. For many applications in optical technology, such layers cannot be used. It should be noted that due to chemical reactions in the crucible, the mixture of molecules evaporated from the melt frequently does not correspond to the composition of the melt. For example, at the evaporation of TiO or $TiO_2$, there can be found, by mass spectrometric analysis, that aside from free titanium atoms, titanium oxide molecules are present in the vapor which correspond to different states of oxidation. Such an evaporation in which the composition of the vapor does not correspond to that of the melt is called incongruent. Thus, titanium oxides evaporate incongruently.

In order to produce largely non-absorptive $TiO_2$ layers, a method of the so-called reactive evaporation can be used, as described in U.S. Pat. No. 2,920,002, in which the evaporation is effected in the presence of an oxidizing atmosphere, for example, in a pure oxygen atmosphere under a pressure of approximately $10^{-4}$ torr. The starting evaporation substance used to this end has been hitherto either $TiO_2$ or, more frequently, the easily fusible known oxides TiO and $Ti_2O_3$. With a corresponding control of the reactive evaporation, any of the mentioned evaporation substances may be used to produce practically non-absorptive $TiO_2$ layers. However, the refractive index of the thus obtained layers is mostly not homogeneous, i.e., it changes in the direction perpendicular to the layer plane. This is construed as a variation in the course of the layer buildup of the composition of the condensate comprising a mixture of the two crystal modifications rutile and anatase, the mixture proportion depending on the deposit conditions.

As it has been found, while using TiO as the starting substance, the refractive index of the finished $TiO_2$ layers may decrease, if the initial value of 2.310 is considered, by approximately $1.8 \times 10^{-4}$ per nonometer layer thickness. This means that if a layer of 300 nm thickness is provided, the difference in the refractive index in the two boundary surfaces of the layer will be approximately 0.054, thus the refractive index will decrease from 2.310 to 2.266. This corresponds to a percentage change of more than 2% of the initial value.

Variations of the refractive index are also obtained with $TiO_2$ as the starting material. A test with $Ti_2O_3$ used for depositing a layer of 200 nm optical thickness resulted in a change of the refractive index from the initial value of 2.245 to the final value of 2.217, thus a decrease by 0.028; this corresponds to more than 1%.

Such strong variations of the refractive index within a single layer sometimes have a very disturbing effect in the optical applications. For calculating and producing optical layer systems, layers of a constant refractive index are desired which can be reproduced at any time. The taking into account of the inhomogeneity of the layers while calculating and producing layer systems is hardly possible and, in any case, complicated.

SUMMARY OF THE INVENTION

The invention provides a method of producing homogeneous $TiO_2$ layers. For the purpose of this description, it should be understood that a "homogeneous" layer is a layer in which the refractive index is constant perpendicularly to the layer surface.

The inventive method of depositing $TiO_2$ layers by evaporation of a molten titanium-oxygen phase and condensation of the vapor on a layer support in the presence of an oxidizing atmosphere is characterized in that the evaporation is effected out from a melt having a composition corresponding to a proportion of the number of oxygen atoms to the number of titanium atoms of between 1.6 and 1.8.

DESCRIPTION OF THE PREFERRED EMBODIMENT

In accordance with the invention, a titanium oxide layer is produced on a layer support by evaporating a molten titanium-oxygen phase having a composition corresponding to a proportion of the number of oxygen atoms to the number of titanium atoms in the range of from 1.6 to 1.8. Vapors are condensed on a layer support in the presence of oxygen.

The molten titanium-oxygen phase necessary for carrying out the invention is obtained in a most simple manner by melting together an initial mixture of titanium and/or titanium oxides in a proportion such that the crucible contains the predetermined proportion of atoms. However, it is more advantageous to start from a titanium-oxygen compound comprising the corresponding oxygen content. Such compounds are known and can be prepared in a preliminary melting process in a particular operational step and used as an evaporation substance in accordance with the invention.

For obtaining a certain proportion of atoms, various initial mixtures may be used. A mixture of one mole of titanium metal and 5 moles of $TiO_2$, for example, comprises the same proportion of atoms as a mixture of 2 moles of TiO and 4 moles of $TiO_2$. In any case, there are 3 atoms of titanium to 5 atoms of oxygen and in the molten phase, the proportion of oxygen atoms to titanium atoms is 5 : 3.

Starting the evaporation with a melt having a proportion of oxygen to titanium atoms 5 : 3, which corresponds stoichiometrically to the compound $Ti_3O_5$, has proved to be very useful.

Another proven variant of the inventive method uses an initial melt having a proportion of oxygen to titanium atoms of 7 : 4 corresponding to a stoichiometric compound $Ti_4O_7$.

The indication of the just mentioned stoichiometric compounds $Ti_3O_5$ or $Ti_4O_7$ does not mean that these compounds must actually be present in the melt or are evaporated. However, the indication means that in carrying out the invention, it is possible to start from these compounds which, in themselves, are known and have a proportion of oxygen to titanium atoms of 5:3 = 1.66 or 7:4 = 1.75, respectively.

By way of example, in using $Ti_3O_5$ as the starting material, seven layers of various thickness were deposited on glass supports by evaporation. The $Ti_3O_5$ was heated in an electrically heated W- or Mo-crucible. After reaching a temperature of approximately 2000°C, a mobile screen was opened, thereby clearing the way for the vapor molecules emerging from the melt to the later support. During the subsequent evaporation, an oxygen pressure of $2.5 \cdot 10^{-4}$ torr was maintained in the evaporation chamber. The thickness of the layers deposited on the support could be continuously measured using known methods. After obtaining the desired layer thickness, the evaporation was stopped by closing the screen.

In the example set forth above, the optical thickness of the thinnest layer was 142 nm, the second layer had a double thickness, the third a triple thickness, etc. However, within an accuracy of better than 1 pro mille, all of the layers had a refractive index of 2.205. It is true that the refractive index of layers deposited in accordance with the invention depends in addition on the other deposit conditions, such as the temperature of the support, and the pressure of the oxidizing atmosphere used during the reactive evaporation. However, if the mentioned factors are kept constant during the evaporation, the index remains constant within the layer.

On the other hand, while using a starting mixture having an oxygen to titanium atoms proportion of 1.5 (that is, the above-mentioned $Ti_2O_3$ as the starting material), an inhomogeneous layer was obtained having a variation of the refractive index of 1% for a layer thickness of 200 nm. A starting mixture having an atom proportion greater than 1.8 is also unsuitable for the inventive purpose. It seems that only the narrow range of composition of the starting material set forth in the present claim ensures the desired success.

Mass spectrometric analyses have shown that the success of the invention is perhaps due to the fact that, in using a molten titanium-oxygen phase of the claimed composition, surprisingly, only TiO molecules are evaporated from the melt. In any other composition outside the indicated limits, on the contrary, $TiO_2$ molecules and titanium atoms are still detectable in the vapor. The circumstances that, in the inventive method, only TiO molecules are evaporated as the sole titanium containing kind of molecules in the oxidizing atmosphere, is due to the fact that during the entire evaporation, the condensate is uniform and, consequently, the deposited layer of $TiO_2$ is homogeneous. In accordance with the tests made up to date, the layer consists mainly of anatase.

What is claimed is:

1. A method of producing $TiO_2$ layers on a layer support, comprising evaporating a melt containing titanium and oxygen having a composition corresponding to a proportion of the number of oxygen atoms to the number of titanium atoms of from 1.6 to 1.8, and condensing the vapor on a layer support in the presence of oxygen.

2. A method of producing $TiO_2$ layers on a layer support, according to claim 1, wherein said melt comprises an oxygen to titanium atoms proportion of 5 : 3.

3. A method of producing $TiO_2$ layers on a layer support, according to claim 1, wherein said melt comprises an oxygen to titanium atoms proportion of 7 : 4.

4. A method of producing $TiO_2$ layers on a layer support, according to claim 1, wherein the melt comprises $Ti_3O_5$.

5. A method of producing $TiO_2$ layers on a layer support, according to claim 1, wherein said melt comprises $Ti_4O_7$.

* * * * *